United States Patent
Chen

(10) Patent No.: US 6,455,969 B1
(45) Date of Patent: Sep. 24, 2002

(54) MULTIPLE LAYER DOUBLE ROTOR SINGLE STATOR SKEW SYMMETRY PERMANENT MAGNET ROTATING MOTOR

(75) Inventor: Ping-Ho Chen, Hsinchu (TW)

(73) Assignee: Chung-Shan Institute of Science & Technology, Chia-an Village (TW)

( * ) Notice: Subject to any disclaimer, the term of this patent is extended or adjusted under 35 U.S.C. 154(b) by 0 days.

(21) Appl. No.: 09/751,980

(22) Filed: Dec. 29, 2000

(30) Foreign Application Priority Data

Oct. 6, 2000 (TW) .......................................... 89120886

(51) Int. Cl.[7] .................... H02K 16/02; H02K 21/12; H02K 1/22
(52) U.S. Cl. ............. 310/114; 310/156.35; 310/156.36; 310/156.37; 310/156.32; 310/156.33; 310/156.34; 310/268
(58) Field of Search ................................. 310/114, 268, 310/156.32–156.37

(56) References Cited

U.S. PATENT DOCUMENTS

| | | | | |
|---|---|---|---|---|
| 3,308,318 A | * | 3/1967 | Dunaiski et al. ............. | 310/114 |
| 3,500,156 A | * | 3/1970 | Thomas ....................... | 318/138 |
| 3,716,769 A | * | 2/1973 | Brunner ....................... | 318/254 |
| 3,783,313 A | * | 1/1974 | Mathur ........................ | 310/49 |
| 3,805,134 A | * | 4/1974 | Osamu et al. ............... | 318/254 |
| 4,503,349 A | * | 3/1985 | Miller ........................ | 310/178 |
| 5,047,680 A | * | 9/1991 | Török ........................ | 310/156 |
| 5,117,141 A | * | 5/1992 | Hawsey et al. ............. | 310/114 |
| 5,117,144 A | * | 5/1992 | Török ........................ | 310/269 |
| 5,124,606 A | * | 6/1992 | Eisenbeis .................... | 310/114 |
| 5,469,095 A | * | 11/1995 | Peppiete et al. ............ | 327/110 |
| 5,525,851 A | * | 6/1996 | Kumamoto et al. ........ | 310/114 |
| 5,675,203 A | * | 10/1997 | Schulze et al. ............. | 310/113 |
| 5,917,257 A | * | 6/1999 | Taghezout ................. | 310/49 R |
| 6,025,660 A | * | 2/2000 | Guérin ...................... | 310/49 R |
| 6,232,690 B1 | * | 5/2001 | Schmider .................... | 310/156 |
| 6,304,017 B1 | * | 10/2001 | Leupold ..................... | 310/115 |
| 6,380,653 B1 | * | 4/2002 | Seguchi ..................... | 310/112 |
| 6,388,346 B1 | * | 5/2002 | Lopatinsky et al. ........ | 310/114 |

* cited by examiner

Primary Examiner—Nestor Ramirez
Assistant Examiner—Pedro Cuevas
(74) Attorney, Agent, or Firm—Ladas & Parry

(57) ABSTRACT

A single-stator-double-rotor rotating motor has one upper-layer rotor, one intermediate-layer armature and one lower-layer rotor. The upper-layer rotor and lower-layer rotor are embedded with the same number of magnets to form a magneto type magnetic pole, stator electrodes of the same number as the number of magnets are disposed on the intermediate-layer armature to form an electro type magnetic pole. A skew symmetry exists between an upper-layer rotor and a corresponding lower-layer rotor, and the upper-layer rotor and the lower-layer rotor are rotated in opposite directions by commutation of the current flowing through exciting coils of the stator electrodes every T/N of time, wherein T is a rotation period of the upper-layer rotor, and N is the number of the magnets.

9 Claims, 9 Drawing Sheets

MULTIPLE LAYER DOUBLE ROTOR SINGLE STATOR SKEW SYMMETRY PERMANENT MAGNET ROTATING MOTOR

BACKGROUND OF THE INVENTION

1. Field of the Invention

The present invention relates to a rotating motor, and particularly to a single-stator-double-rotor (S1R2) rotating motor.

2. Description of Related Art

In a prior motor structure, a rotor is rotated in one direction, but a Gyro effect will be induced and thus it is difficult to control the rotating direction of the motor's shaft.

Another prior rotating motor includes two rotors rotating in opposite directions, and in general has three structures as follows:

(1) a reduction and reverse mechanism of a gasoline engine;
(2) two mutually independent motors rotating in opposite directions; and
(3) a single motor, whose rotating rotors and stators are rotated in opposite directions.

Disadvantages of the first structure include a big noise, a high frequency to refill the engine with gasoline, and a need for a reduction and reverse mechanism. Besides, to drive a gasoline engine is less convenient, as compared with an electronically or electro magnetically controlled engine.

Disadvantages of the second structure include a high cost, high loading and a need for two sets of driving circuits.

A disadvantage of the third structure is difficult to control the rotating speed between a rotor and a stator.

SUMMARY OF THIEF INVENTION

A first object of the present invention is to provide a rotating motor with a large energy efficiency to directly transform an electrical power to a mechanic power.

A second object of the present invention is to provide a rotating motor with a simple structure, which performs a high efficient power with a low weight.

A third object of the present invention is to provide a rotating motor with a low noise, which can directly drive a motor without a speed-reducing mechanism.

A fourth object of the present invention is to provide a rotating motor with a brushless form to reduce a maintenance fee.

A fifth object of the present invention is to provide a rotating motor which is free from a Gyro effect to enhance the controllability of rotation direction.

The present invention can be applied to a rotating motor in a military torpedo for controlling the thrust of the torpedo. In addition to generating a thrust to overcome water resistances, the rotating motor of the present invention also balances the thrust in the axis of the rotating motor to avoid generating a torque. The present invention can be further applied to a military double-rotor Gyro equipment, whose speed could be improved by changing angular momentum during rotation. The third application of the present invention is a mower, which could be directly driven without a speed-reducing and reverse mechanism. Since a brushless form is adopted, there will be no sparkle generated by the rotating motor.

The present invention mainly comprises one upper-layer rotor, one intermediate-layer armature and one lower-layer rotor. The upper-layer rotor and lower-layer rotor are embedded with the same number of magnets to form a "magneto type" magnetic pole, stator electrodes of the same number as the number of magnets are disposed on the intermediate-layer armature to form an "electro type" magnetic pole, each of the stator electrodes has flanges respectively on its top and bottom sides for use in winding start/kick coils, each of the start/kick coils is excited by the regeneration current of the exciting coil of the stator prior to commutation. In such a way, continuity of coil current or torque smoothness, in the sense, can be acquired while in a dead zone with poles aligned. The characteristic of the present invention is that a skew symmetry exists between an upper-layer rotor and a corresponding lower-layer rotor, and the one upper-layer rotor and one lower-layer rotor are rotated in opposite directions by changing the direction of the current flowing through exciting coils of the stator electrodes every T/N of time, wherein T is a rotation period of the upper-layer rotor, and N is the number of the magnets.

BRIEF DESCRIPTION OF THIEF DRAWINGS

The present invention will be described according to the appended drawings in which.

PREFERRED EMBODIMENT OF THE PRESENT INTENTION

Figure 1:
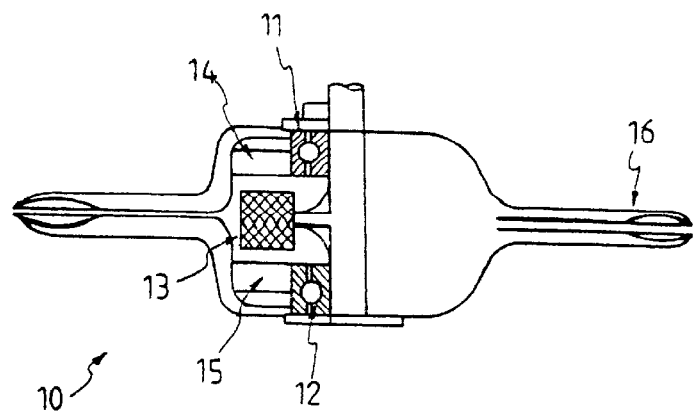
FIG. 1 shows a cross-sectional view of the single-stator-double-rotor rotating motor according to an embodiment of the present invention.

FIG. 1 shows a cross-sectional view of an embodiment of the single-stator-double-rotor (S1R2) rotating motor according to the present invention. The S1R2 rotating motor 10 comprises a bearing 11, a bearing 12, an armature layer 13, an upper-layer rotor 14, and a lower-layer rotor 15. The motor 10 is formed as a ring structure. The armature 13 is winded. Both ends of the S1R2 rotating motor 10 have their applications, such as a scissor 16 of a mower. With the torque generated by the upper-layer rotor 14 and lower-layer rotor 15, the scissor 16 will be continuously opened and closed to execute its job.

Figure 2:
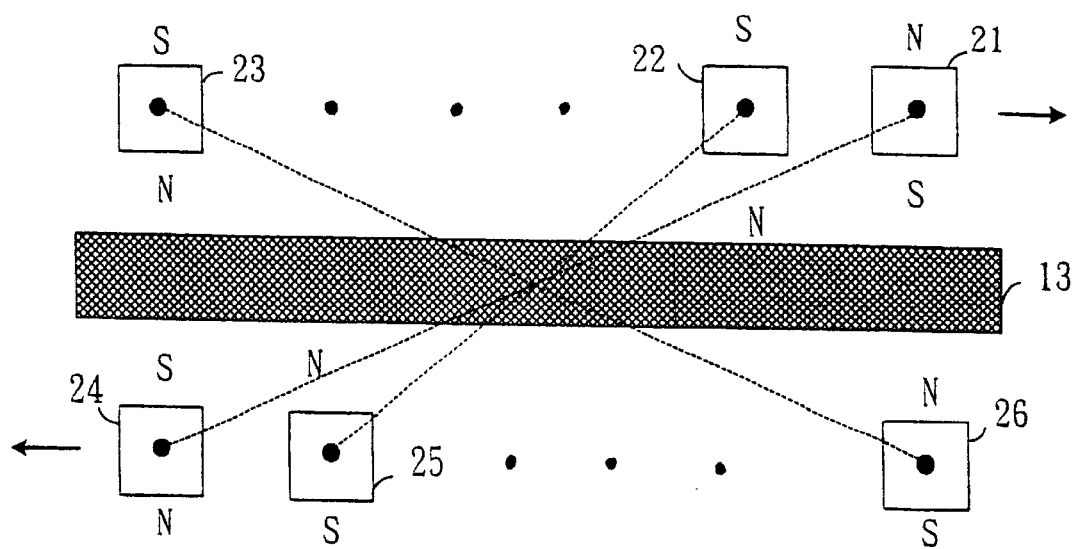
FIG. 2 shows a schematic diagram of upper-layer motors, the armature layer and lower-layer motors of the single-stator-double-rotor rotating motor according to the present invention.

FIG. 2 shows a schematic diagram of the upper-layer rotor, the armature layer and the lower-layer rotor of the single-stator-double-rotor rotating motor according to the present invention. In FIG. 2, the upper-layer rotor 14 and lower-layer rotor 15 are embedded with a plurality of magnets respectively, and the ring structures of the upper-layer rotor 14 and lower-layer rotor 15 are spread. In other words, a magnet 21 of the upper-layer rotor 14 is neighboring to magnets 22 and 23 of the upper-layer rotor 14 in the ring structures, and a magnet 24 of the lower-layer rotor 15 is neighboring to magnets 25 and 26 of the lower-layer rotor 15 in the ring structures. Besides, the neighboring magnets of the upper-layer rotor 14 and the lower-layer rotor 15 have opposite polarities. In FIG. 2, it can be found that the magnetism distributions of the plurality of magnets are symmetrical. For example, the magnet 21 of the upper-layer rotor 14 corresponds to the magnet 24 of the lower-layer rotor 15, the magnet 22 of the upper-layer rotor 14 corresponds to the magnet 25 of the lower-layer rotor 15. The symmetry phenomenon is called as "skew symmetry effect." Since the distribution of the torque, the upper-layer rotor 14 will move to the right, and the lower-layer rotor 15 will move to the left. If the S1R2 rotating motor (not shown) is viewed from the top, the upper-layer rotors will rotate clockwise, and the lower-layer rotors will rotate counterclockwise.

Figure 3:
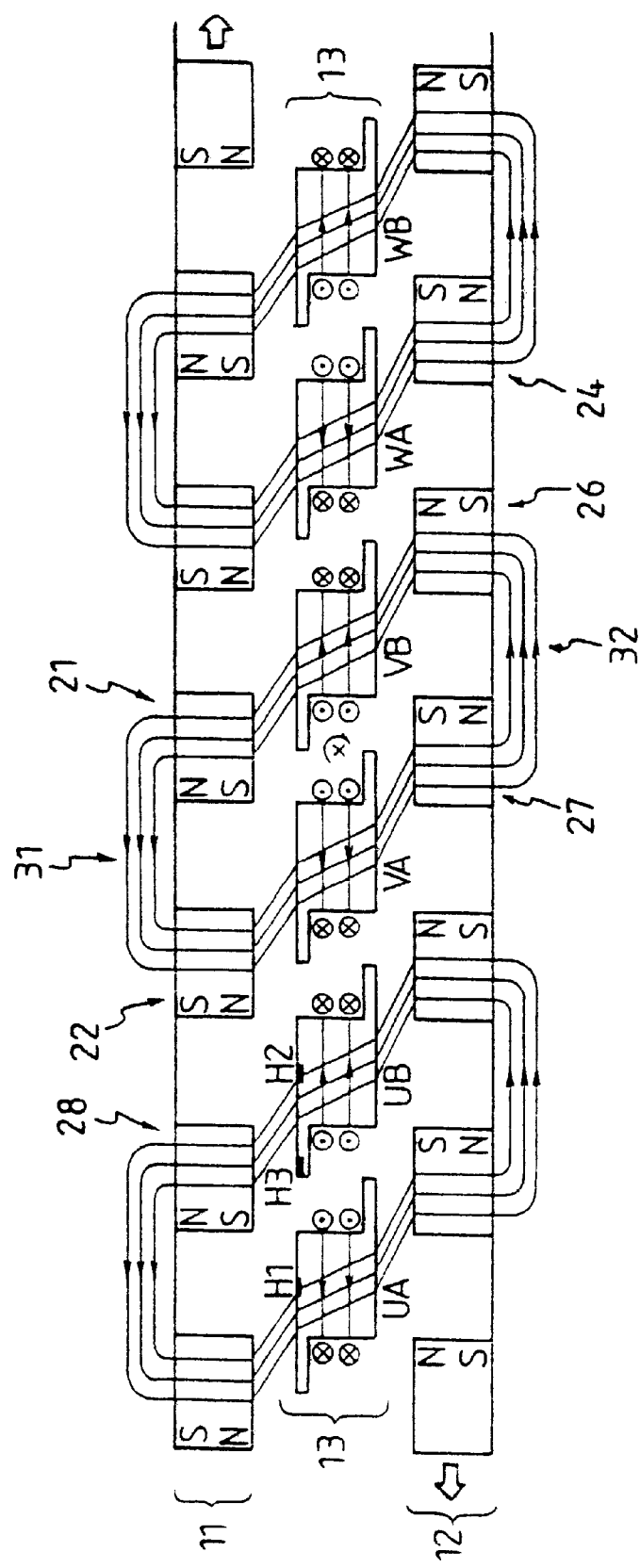
FIG. 3 shows a schematic diagram of forming a magnetic torque of the single-stator-double-rotor rotating motor according to the present invention.

FIG. 3 shows a schematic diagram of forming a magnetic torque of the single-stator-double-rotor rotating motor according to the present invention, wherein the rotating motor has 6 electrodes and 6 slots. A symbol x represents a current flowing inward to the paper, and a symbol represents a current flowing outward from the paper. The stator armature 13 is stacked by a plurality of laminated silicon steel sheets, to reduce the eddy current loss, and is divided into 6 groups of armatures. Each armature is winded with exciting coils $U_A$, $U_B$, $V_A$, $V_B$, $W_A$, and $W_B$. The notation ⟲ represents its loop torque direction. The exciting coils of the neighboring stator electrodes have opposite flowing directions of current. Therefore, 3 sets of magnetic flux loops are formed counterclockwise. For example, a loop is formed by a magnet 26 of the lower-layer rotor 15, an exciting coil $V_B$ of the stator electrodes, a magnet 21 of the upper-layer rotor 14, an upper yoke 31, a magnet 22 of the upper-layer rotor 14, an exciting coil $V_A$ of the stator electrode, a magnet 27 of the lower-layer rotor 15 and a lower yoke 32. Besides, a first Hall component H1, a second Hall component H2 and a third Hall component H3 are placed beside the body of the exciting coil $U_A$ of the stator electrode, the body of the exciting coil $U_B$ of the stator electrode and a stator flange of the coil $U_A$ to convert a magnetic flux into a voltage signal. The magnetic torque is formed by a loop of a distorted magnetic flux to keep the upper-layer rotor rotating counterclockwise when viewed from the top. (i.e. moving to the right in a cross-sectional view), and keep the lower-layer rotor rotating clockwise when viewed from the top (i.e. moving to the left in a cross-sectional view).

Figure 4:
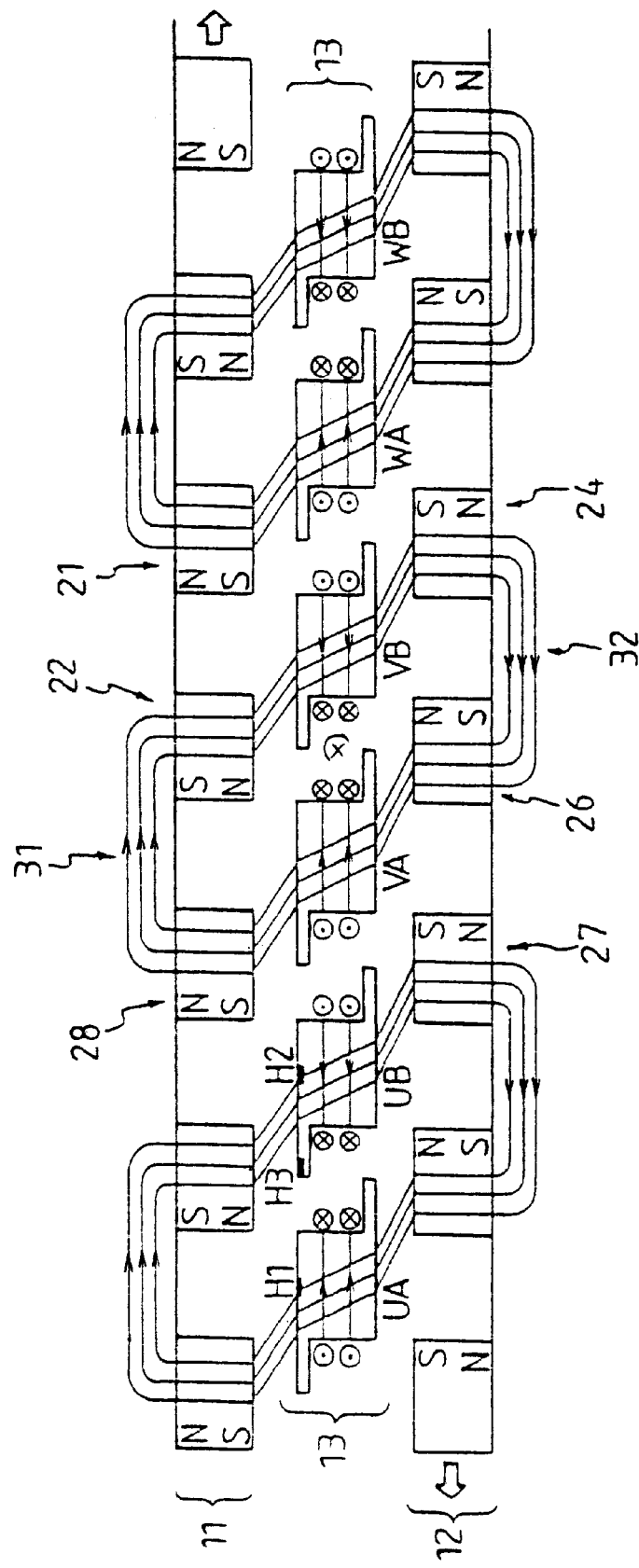
FIG. 4 shows another schematic diagram of forming a magnetic torque of the single-stator-double-rotor rotating motor according to the present invention.

FIG. 4 shows another schematic diagram of forming a magnetic torque of the single-stator-double-rotor rotating motor according to the present invention. The directions of current flow of the exciting coils $U_A$, $U_B$, $V_A$, $V_B$, $W_A$ and $W_B$ of 6 stator electrodes are opposite to those of the structure of FIG. 3, and the opposition is called as current commutation. Besides, since the directions of current flowing in the exciting coils of the neighboring stators are opposite, 3 sets of clockwise magnetic loops are formed. For example, a loop is formed by a magnet 24 of the lower-layer, a lower yoke 32, a magnet 26 of the lower-layer, an exciting coil $V_A$ of the stator electrode, a magnet 28 of the upper-layer rotor, upper yoke 31, a magnet 22 of the upper-layer rotor and an exciting coil $V_B$ of the stator electrode. The purpose of the brushless current commutation is to continuously drive the upper-layer rotor to rotate counterclockwise when viewed from top (i.e. moving to the right in a cross-sectional view), and continuously drive the lower-layer rotor to rotate clockwise viewed from the top (i.e. moving to the left in a cross-sectional view).

Figure 5:
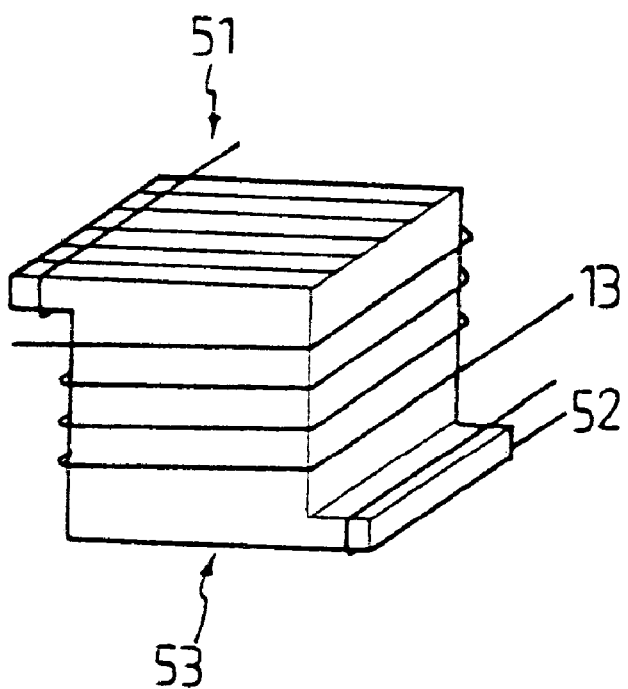
FIG. 5 shows a schematic diagram of exciting coils and start/kick coils of the armature according to the present invention.

FIG. 5 shows a schematic diagram of an armature winding of the stator electrode according to the present invention. The structure of the stator electrode comprises a body 53, a left-top flange and a right-bottom flange. Start/kick coils 51, 52 are placed beside the left-top flange and right-bottom flange. For averaging the start/kick torque in every cycle, a set of start/kick coils is winded on every stator electrode.

Figure 6:
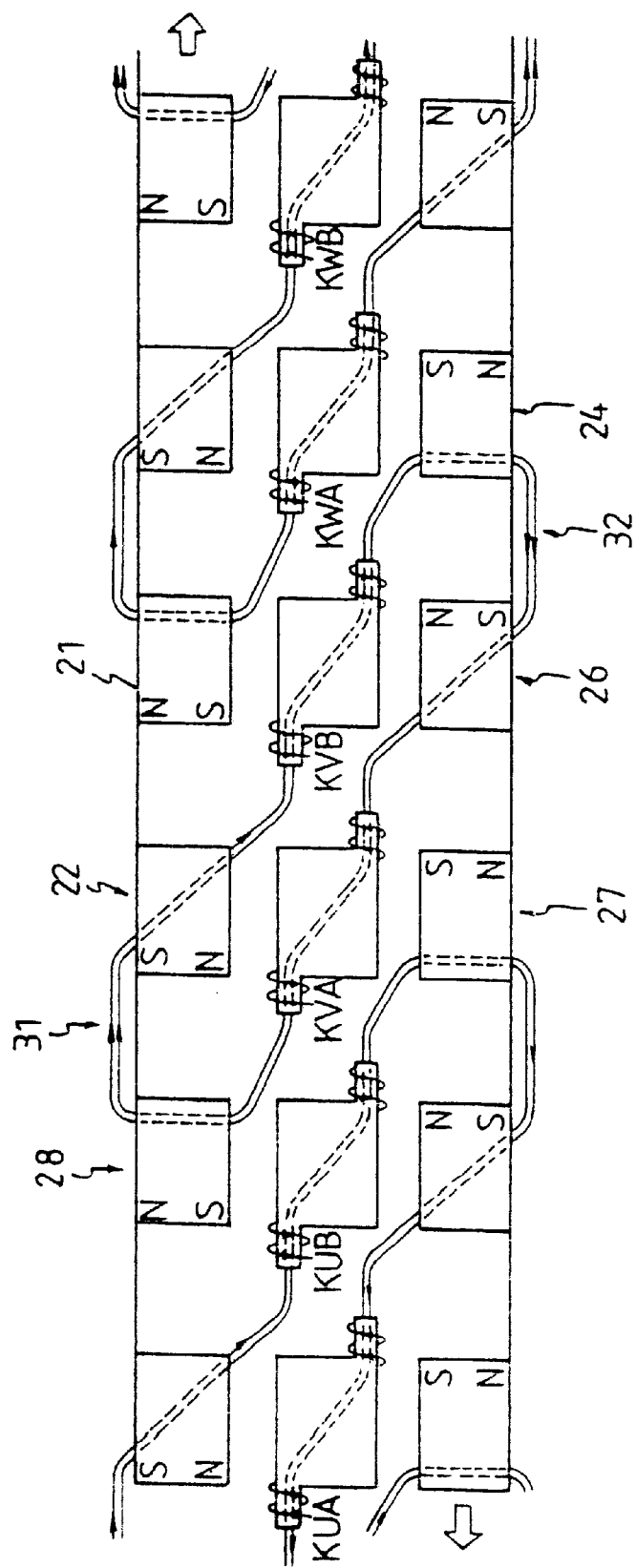
FIG. 6 shows a schematic diagram of magnetic torque distributions of start/kick coils when starting and kicking according to the present invention.

FIG. 6 shows a schematic. diagram of magnetic torque distributions of start/kick coils when starting and kicking according to the present invention. When the magnets of the upper-layer rotor, stator electrodes and the magnets of the lower-layer rotor are in a straight line, strength of the magnetic torque is not generated by a flux distortion. At this moment, in a region, the magnets of the upper-layer and lower-layer rotors are rotated due to an inertia property. The region is called as a dead zone or a neutral position. Besides, a current commutation will be performed in the dead zone; therefore, an action of start and kick must be executed to force the S1R2 rotating motor to switch the direction of current flow. The action of start and kick is performed by the start/kick coils 51, 52 winded and converted in series on the left-top flange and right-bottom flange of the stator electrode in FIG. 5. Similar to the phenomenon of the magnetic torques in FIG. 3 and FIG. 4, the magnetic torque of the start/kick coils still has a skew symmetry effect. The magnetic torque is clockwise to force the upper-layer rotor to rotate counterclockwise when viewed from the top (i.e. moving to the right in a cross-sectional view), and force the lower-layer rotor to rotate clockwise when viewed from the top (i.e. moving to the left in a cross-sectional view). 3 sets of clockwise magnetic flux loop will be formed. For example, a loop is formed by a magnet 24 of the lower-layer rotor, lower yoke 32, a magnet 26 of the lower-layer rotor, a start/kick coil KVA of the stator electrode, a magnet 28 of the upper-layer rotor, an upper yoke 31, a magnet 22 of the upper-layer rotor and a start/kick coil KVB of the stator electrode. Besides, when starting, the directions of current flowing in the start/kick coils of the neighboring electrodes are opposite.

Figure 7:
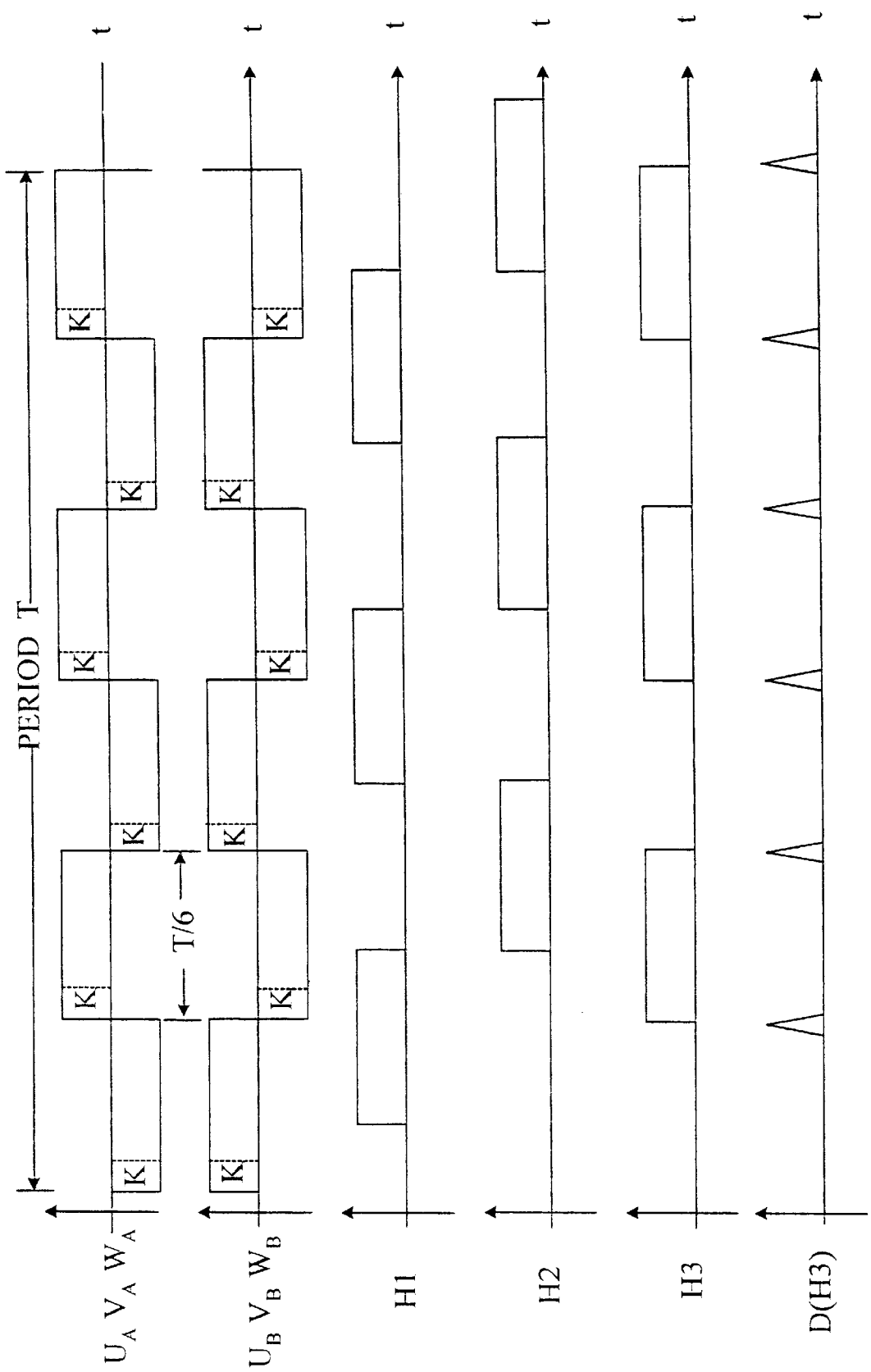
FIG. 7 shows a timing diagram of current phases of a stator electrode and voltage phases of Hall components according to the present invention.

FIG. 7 shows a timing diagram of current phases of the stator electrode and voltage phases of the Hall components according to the present invention. Since the S1R2 rotating motor 10 has 6 electrodes and 6 slots in one mechanical cycle T, the directions of current flowing through the exciting coils $U_A$, $U_B$, $V_A$, $V_B$, $W_A$ and $W_B$ of the stator electrodes will change 6 times. During the period of current commutation of the exciting oils $U_A$, $U_B$, $V_A$, $V_B$, $W_A$ and $W_B$ of the stator electrodes, a kick action is activated by the startkick coils, thereby alleviating the problem of instant huge voltage induced by the exciting coils when a current commutation happens. The leading edge and trailing edge of the waveform generated by the Hall component H 3 are corresponding to a pulse D (H3) for generating a speed signal and commutation signal of the exciting coils $U_A$, $U_B$, $V_A$, $V_B$, $W_A$ and $W_B$ of the stator electrodes. In other words, every non-continuous point of a voltage curve outputted from the third Hall component H3 corresponds to a pulse signal for speed-driving. The Hall components H1 and H2 can form a close loop to monitor and control the speed of the S1R2 rotating motor.

Figure 8:
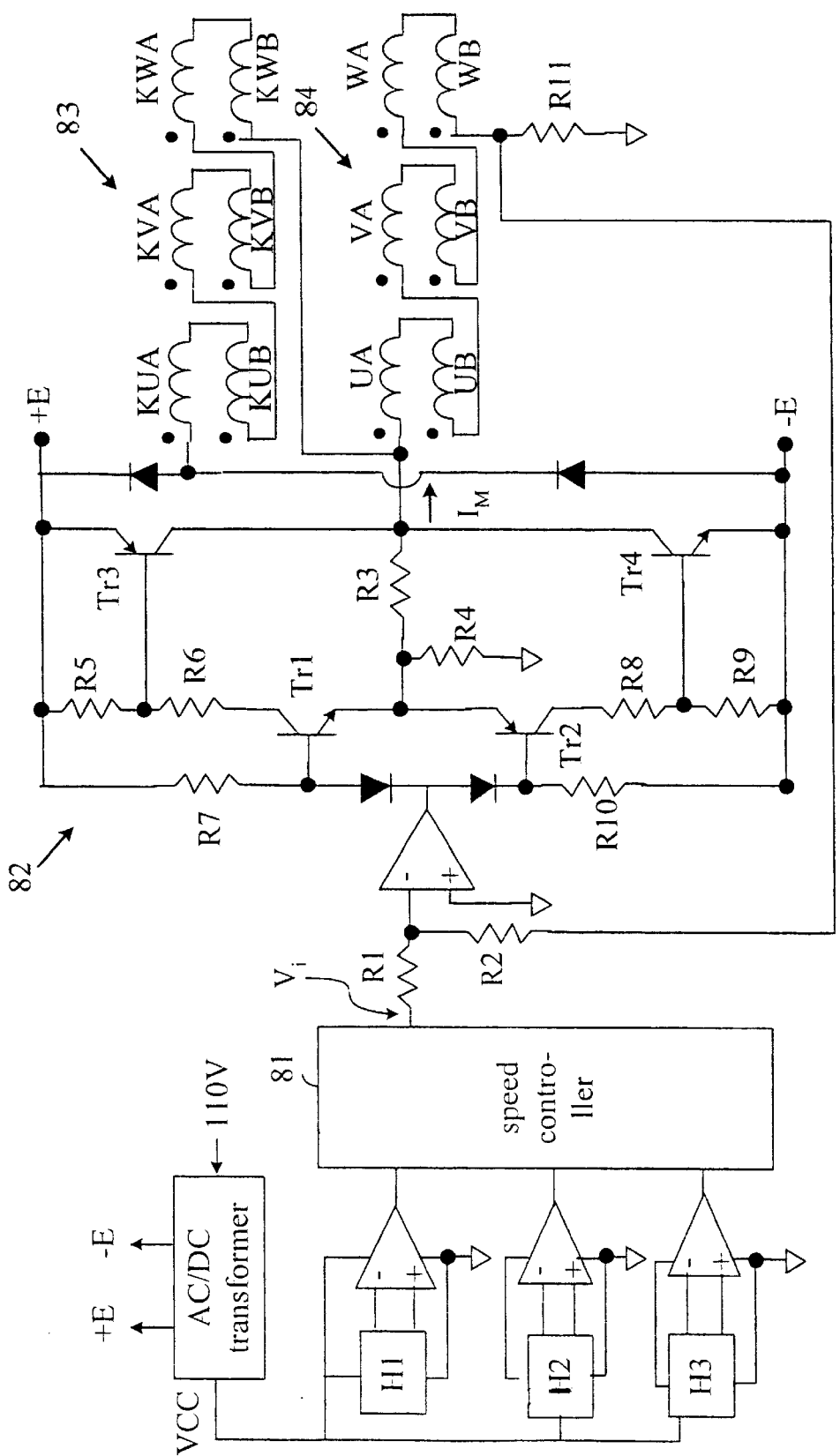
FIG. 8 shows a current-driving circuit according to the present invention.

FIG. 8 shows a current-driven circuit according to the present invention. One end of a speed controller 81 is connected to the Hall components H1, H2 and H 3, and uses a fussy algorithm to control an output voltage Vi with polarity positive, zero or negative and magnitude. Another end of the speed controller 81 is connected to a power amplifier circuit 82, such as a well-known Darlington circuit. The exciting coils $U_A$, $U_B$, $V_A$, $V_B$, $W_A$ and $W_B$ of the stator electrodes are connected in series to form an exciting series coil 84. The start/kick coils $KU_A$, $KU_B$, $KV_A$, $KV_B$, $KW_A$ and $KW_B$ are connected in series to form a starulkick series coil 83. The exciting series coil and startkick series coil are connected to one end of the power amplifier circuit 82. The exciting series coil 84 is, in a feedback form connected to the speed controller 81 through resistors R1 and R2 so as to feed back an end voltage through a resistor R11. The output voltage $V_i$ is proportional to a motor current $I_m$; therefore, the current flowing into the exciting coil and startadck coil of the stator electrodes can be adjusted automatically. The relationship of $I_m$, R1, R2, R11 and Vi is denoted by Eq. (1):

$$I_m = -\frac{R2 \times R11}{R1} \times V_i \quad (1)$$

Prior to a current commutation of the exciting coils $U_A$, $U_B$, $V_A$, $V_B$, $W_A$ and $W_B$ of the stator electrodes, the instant coil current will flow into the start/kick series coil 83 to keep the continuity of coil current. Besides, a suitable time constant is obtained by adjusting the inductance and resistance of the start/kick series coil 83 to decide the period of the transient time of the start/kick action.

Figure 9:
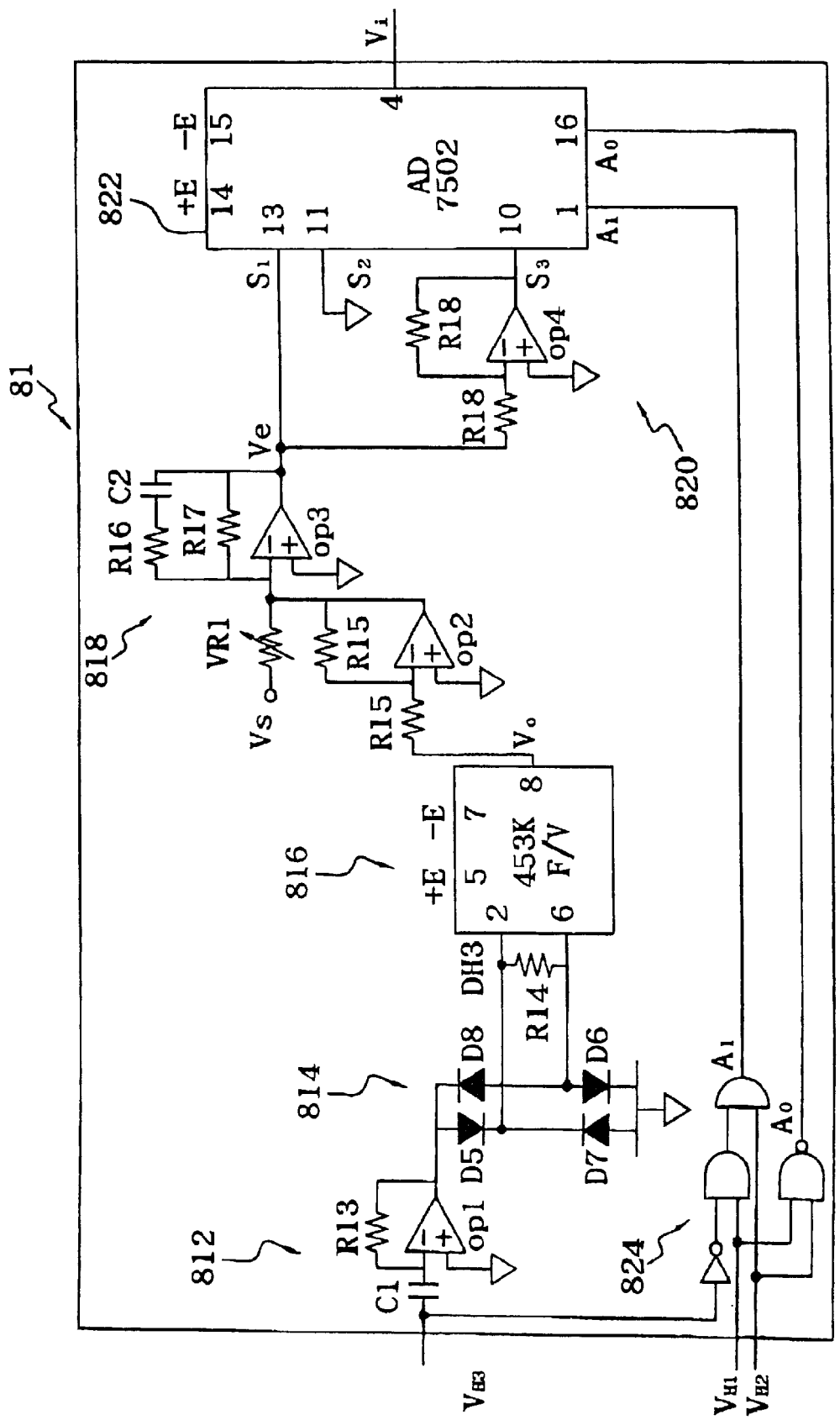
FIG. 9 shows an implementation of the speed controller 81.

FIG. 9 is an implementation of the speed controller 81. The speed controller 81 includes a differentiator 812, a rectifier 814, a frequency/voltage converter 816, a negative feedback and its compensator circuitry 818, an inverter 820, an analogue switch 822 and a logic circuit 824. The Hall component H3 output signal $V_{H3}$ is differentiated and rectified by the differentiator 812 and the rectifier 814 respectively, then its frequency is converted to an analogue voltage Vo representative of the angular velocity of rotors via the frequency/voltage converter 816 as a feedback signal. The analogue voltage Vs of the setting angular velocity and the Vo are through the negative feedback and compensator circuitry 818 to generate an error compensation signal voltage Ve. Ve connects to the $S_1$ of the analogue switch 822 and to the $S_3$ of the analogue switch 822 through the inverter 820 in parallel. $S_2$ is grounded. The Boolean algebra of the output $A_1$ and $A_0$ of the logic circuit 824 are showed in Eq. (2) and (3).

$$A_1 = (H1 \cap \overline{H3}) \cap H2 \quad (2);$$

$$A_0 = \overline{H1} \cup \overline{H2} = \overline{(H1 \cap H2)} \quad (3);$$

The switch control signals $A_0$ and $A_1$ are further inputs of the analogue switch 822. The output voltage $V_i$ of the analogue switch 822, i.e. the input of the power amplifier circuit 82, comprises the characteristics of being positive, zero or negative for controlling current commutation and magnitude proportional to torque increment.

Figure 10:
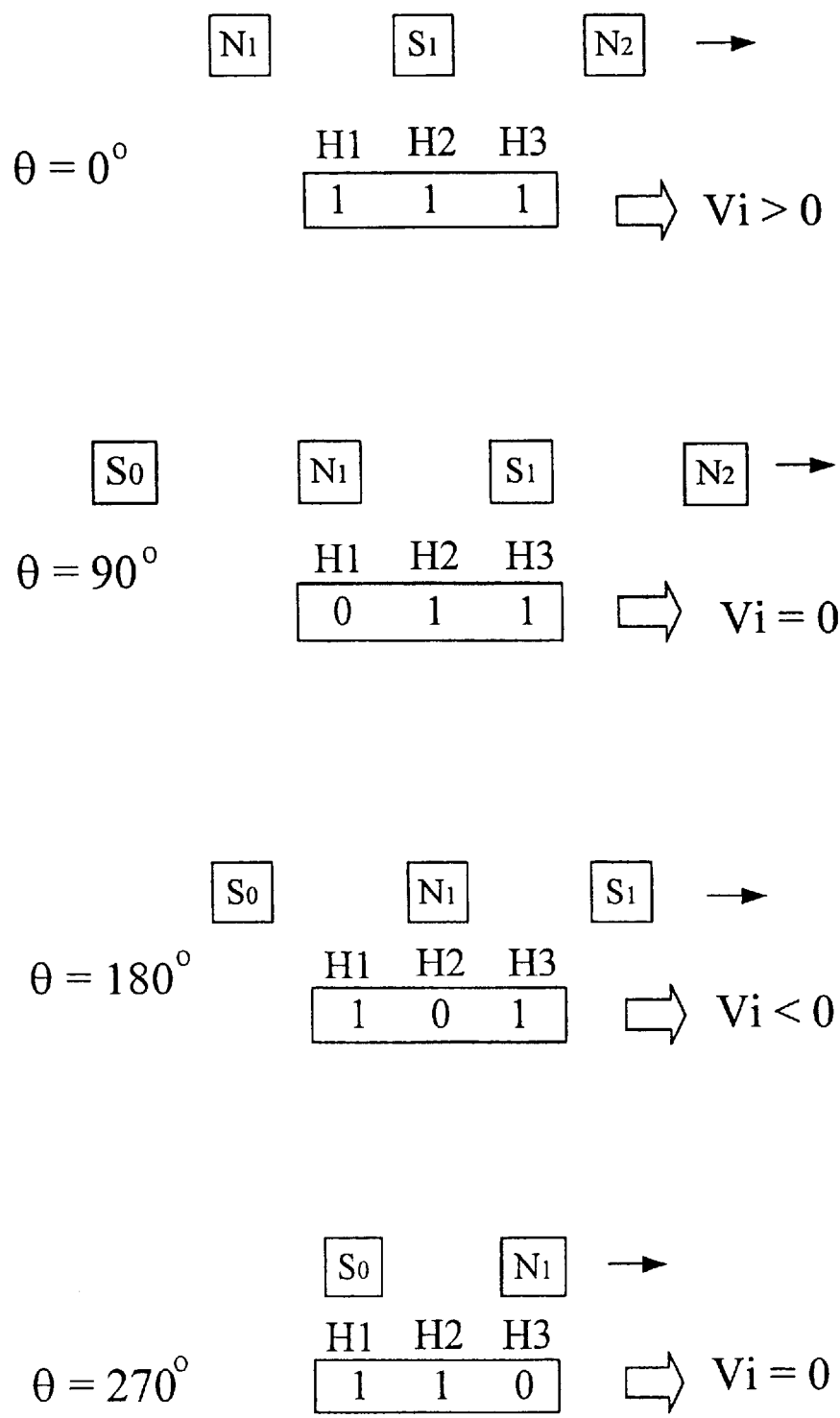
FIG. 10 shows the relations of the corresponding position of magnets and Hall components versus the Vi at various electrical angle θ.

FIG. 10 shows the relations of the corresponding position of magnets and Hall components versus the Vi at various electrical angle θ. Due to different distribution of magnetic flux at different electrical angle, there are 4 phases combined of voltages $V_{H1}$, $V_{H2}$ and $V_{H3}$ from Hall components as the inputs of the speed controller 81, and then the speed controller 81 output Vi at various electrical angles can be obtained. Thus, coil current commutation can be separated into 4 phases in sequence as well. The first phase is a period of input of positive Vi to the power amplifier circuit 82. Referring to FIG. 8 again, transistors Tr2 & Tr4 are turned on, the current only flows from the $W_B$ end to the $U_A$ end of exciting series coils 84. During the second phases with zero voltage of Vi input, transistors Tr1~Tr4 are all turned off, the remaining current is to be dieaway in the exciting series coils 84 and flows through the flywheel loop in the order of $W_B$, $U_A$, $KW_B$, $KU_A$ (start/kick series coils 83 ), D1 and +E. This is a phase of positive electrode regeneration via start/kick coil current flow. The third phase is a period of negative voltage Vi, transistors Tr1 and Tr3 are turned on, and current only flows from the $U_A$ end to the $W_B$ end of exciting series coils 84. The fourth phase is another zero voltage of Vi input, Tr1~Tr4 are all turned off again, the remaining current is to be dieaway and flows through the flywheel loop in the order of $U_A$, $W_B$, GND, -E, D2, $KU_A$ and $KW_B$. This is a phase of negative electrode regeneration via start/kick coil current flow. Table 1 shows the fussy logic table of the Hall components, Vi, $A_0$, $A_1$, and the selected switch at various electrical angles θ.

TABLE 1

| Hall components | | | Vi | | | Switch control signal | | Selected switch switch (on) | Phase. |
|---|---|---|---|---|---|---|---|---|---|
| H1 | H2 | H3 | >0 | =0 | <0 | $A_1$ | $A_0$ | | |
| 1 | 1 | 1 | 1 | 0 | 0 | 0 | 0 | S1 | $\theta = 0°$ |
| 0 | 1 | 1 | 0 | 1 | 0 | 0 | 1 | S2 | $\theta = 90°$ |
| 1 | 0 | 1 | 0 | 0 | 1 | 1 | 0 | S3 | $\theta = 180°$ |
| 1 | 1 | 0 | 0 | 1 | 0 | 0 | 1 | S2 | $\theta = 270°$ |

There are many merits of the present invention including (a) Because each rotor of the present invention rotates in an unique direction, a traditional low cost bipolar amplifier can be used as the power amplifier circuit 82 instead of a "H" type amplifier for brush motors or a CMOS 6-pack transistor amplifier for 3-phase brushless motors; (b) Because the exciting coils of the stator electrodes are connected in series, the simultaneous coil excitation can obtain higher torque/current ratio than traditional 6-step DC brushless motors that have 3 phase coils but only 2 phases on at a time; and (c) Introducing "regeneration" current to the start/kick coils at the time of current commutation for better energy utilization efficiency.

The afore-mentioned embodiments of the present invention are intended to be illustrated only. Numerous alternative embodiments may be devised by those skilled in the art without departing from the scope of the following claims.

What is claimed is:

1. A single-stator-double-rotor rotating motor, comprising one upper-layer rotor, one intermediate-layer armature and one lower-layer rotor; wherein said upper-layer rotor and lower-layer rotor are embedded with the same number of magnets, stator electrodes of the same number as the number of magnets are disposed on said intermediate-layer armature; characterized in that a skew symmetry exists between a magnet of the upper-layer rotor and a corresponding magnet of the lower-layer rotor, and the upper-layer rotor and the lower-layer rotor are rotated in opposite directions by changing the direction of the current flowing through exciting coils of said stator electrodes every T/N of time, wherein said exciting coils are electrically connected in series, T is a rotation period of the upper-layer rotor, and N is the number of the magnets, each of said stator electrodes has flanges respectively on its top and bottom sides for use in winding start/kick coils, each of said start/kick coils is excited when the upper-layer rotor, the intermediate-layer armature and the lower-layer rotor are situated in a dead zone, and currents of neighboring start/kick coils have opposite directions to each other for keeping the continuation of current variations when the directions of currents flowing through the exciting coils of the stator electrodes are changed.

2. The single-stator-double-rotor rotating motor of claim 1, wherein the neighboring magnets on the upper-layer rotor and the neighboring magnets on the lower-layer rotor have opposite polarities, and the currents flowing through the exciting coils of the neighboring stator electrodes have opposite directions.

3. The single-stator-double-rotor rotating motor of claim 1, wherein a first Hall component is situated beside a body of the stator electrode to transfer a magnetic flux passing the body of the stator electrode into a voltage signal; a third Hall component is situated beside the flange of another neighboring stator electrode to transfer a magnetic flux passing the body of the stator electrode into a voltage signal; and a second Hall component is situated beside the body of the neighboring stator electrode to transfer a magnetic flux passing the body of the stator electrodes into a voltage signal.

4. The single-stator-double-rotor rotating motor of claim 3, wherein a non-continuous point of a voltage curve outputted from the third Hall component corresponds to a pulse signal for driving the plurality of start/kick coils winded around the stator electrodes.

5. The single-stator-double-rotor rotating motor of claim 3, wherein the first, the second and the third Hall components are used to monitor and control the rotating speed of the rotating motor.

6. The single-stator-double-rotor rotating motor of claim 3, further comprising a driving circuit for controlling the current flowing through the exciting coils of the stator electrodes and start/kick coils, said driving circuit comprising:

a speed controller connected to the plurality of Hall components for generating an output voltage $V_i$;

a power amplifier circuit for generating an output current $I_m$;

an exciting series coil connected in series to the plurality of exciting coils winded around the bodies of the stator electrodes;

a start/kick series coil connected in series to the plurality of start/kick coils winded around the flanges of the stator electrodes; and a feedback circuit connected to the exciting series coil, the speed controller and the power amplifier circuit.

7. The single-stator-double-rotor rotating motor of claim 6, wherein the feedback circuit is connected to the power amplifier circuit and speed controller with a resistor R1, then connected to the exciting series coil with a resistor R2, and then connected to the ground with a resistor R11, wherein $$I_m = -\frac{R2 \times R11}{R1} \times V_i.$$

8. The single-stator-double-rotor rotating motor of claim 6, wherein the power amplifier circuit is a Darlington circuit.

9. The single-stator-double-rotor rotating motor of claim 6, wherein in the dead zone, the current flowing through the exciting series coil will flow into the start/kick coil via flywheel diodes to keep the continuity of current flowing through the exciting series coil when flowing directions are changed.

* * * * *